United States Patent [19]

Goyne

[11] 4,165,287

[45] Aug. 21, 1979

[54] POTTING PLEATED MEMBRANE

[75] Inventor: Thomas E. Goyne, Denver, Colo.

[73] Assignee: Cobe Laboratories, Inc., Lakewood, Colo.

[21] Appl. No.: 784,364

[22] Filed: Apr. 4, 1977

[51] Int. Cl.² .......................................... B01D 31/00
[52] U.S. Cl. ................................ 210/232; 210/321 B; 210/493 M; 264/257; 264/286
[58] Field of Search ................ 210/493 M, 13, 321 B, 210/22, 232; 264/258, 257, 286; 55/521, DIG. 5, DIG. 12; 23/258.5 M

[56] References Cited

U.S. PATENT DOCUMENTS 4,028,252  6/1977  Morris .......................... 210/493 M X
4,116,841  9/1978  Borsonyi ........................ 210/321 B Primary Examiner—Frank A. Spear, Jr.

[57] ABSTRACT

A fluid flow transfer apparatus is constructed by placing a pleated membrane within a central chamber in a housing, injecting liquid potting material into the central chamber, positioning the housing while the potting is still flowable such that the membrane tips to be anchored to the housing are horizontal at the bottom of the membrane body and the inner housing surface adjacent to those membrane tips is horizontal, allowing the liquid potting to flow between that surface and those lower membrane tips and settle uniformly therebetween, and curing the potting material to anchor those tips to the housing.

12 Claims, 6 Drawing Figures

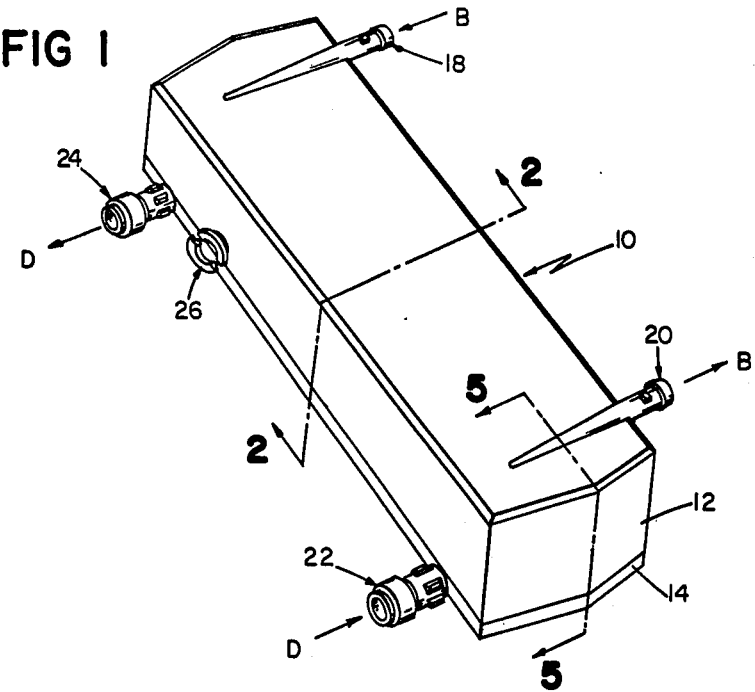
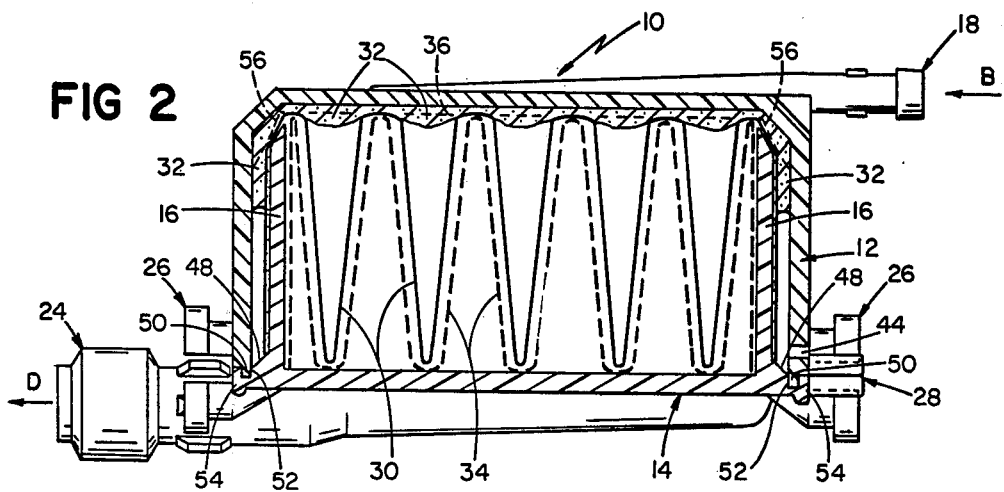

POTTING PLEATED MEMBRANE

FIELD OF THE INVENTION

This invention relates to fluid flow transfer devices using pleated membranes.

BACKGROUND OF THE INVENTION

In constructing a fluid flow transfer device using a pleated membrane such as a hemodialyzer, it is desirable to anchor the membrane tips on the blood (or other fluid to be dialyzed) side to the apparatus housing interior to direct the blood flow into the membrane folds and prevent shunting of blood from inlet to outlet without being dialyzed in the folds. One problem has been development of a simple but effective method of anchoring the tips. One proposed solution has been to apply a thickened polyurethane potting over the surface of the housing interior through a hollow paddle-shaped spreader. However, this method is time-consuming, and potting is not uniform.

SUMMARY OF THE INVENTION

I have discovered that uniform potting can be effected by placing a pleated membrane within a central chamber in a housing, injecting liquid potting material into the central chamber, positioning the housing while the potting is still flowable such that the membrane tips to be anchored to the housing are horizontal at the bottom of the membrane body and the inner housing surface adjacent to those membrane tips is horizontal, allowing the liquid potting to flow between that surface and those lower membrane tips and settle uniformly therebetween, and curing the potting material to anchor those tips to the housing.

In particular aspects the invention includes provision of spaced apart ribs extending along the inner housing surface adjacent the membrane tips to be anchored to the housing, to space those tips from that housing surface and thereby provide a plurality of flow channels for the potting to flow across the inner housing surface and settle uniformly thereon. The invention also includes a pair of side compartments, one on each side of the central chamber, separated from the central chamber by fins. The aforesaid ribs extend into the side compartments and space the fin tips from housing inner surfaces whereby the flow channels extend from the central chamber into the side compartments, to permit flow of potting into or out of those compartments.

PREFERRED EMBODIMENT

We turn now to description of the presently preferred embodiment of the invention.

DRAWINGS

FIG. 1 is a perspective view of the presently preferred embodiment;

FIG. 2 is a somewhat diagrammatic sectional view along 2—2 of FIG. 1;

FIG. 3 is an exploded view of a portion of the membrane and support netting of the embodiment of FIG. 1;

DESCRIPTION

Figure 4:
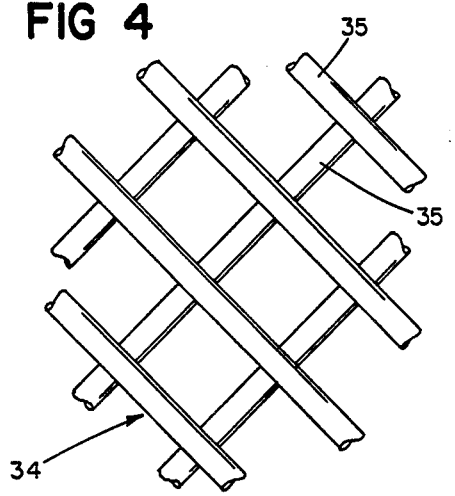
FIG. 4 is an enlarged perspective view of a portion of the support netting of FIG. 3.

The embodiment shown in the drawings and its method of manufacture and operation are now described.

1. Embodiment and Method of Manufacture

FIGS. 1 and 2 show dialyzer 10, which includes a two-part housing comprising trough-shaped polycarbonate casing 12 and interfitting polycarbonate casing 14, which is open at both longitudinal ends and has a pair of longitudinal fins 16. Casing 12 includes inlet 18 and outlet 20, both integrally molded therewith. Casing 14 includes integrally molded inlet 22 and outlet 24. Inlets 18 and 22 and outlets 20 and 24 become channels of steadily decreasing cross section when they enter their respective casings. A pair of stub shafts 26, formed by mating semicircular portions on casings 12 and 14, and a pair of cooperating stops 28 (only one is shown in FIG. 2), spaced equidistantly longitudinally from the right stub shaft, permit rotatable, vertical mounting of the dialyzer on a bracket, for degassing and normal operation.

Dialysis membrane 30, a Cuprophan (trademark of Enka Glanzstoff AG) cuprammonium cellophane sheet having a generally accordion pleated configuration, is squeezed between fins 16, and is sealed with polyurethane potting 32 along its outermost flaps to the outer faces of the fins. The folded upper tips of membrane 30, shown somewhat rounded in FIG. 2, are affixed to casing 12 by being anchored in polyurethane potting 32, thereby forming a series of separate parallel fluid flow passages, indicated by B in FIG. 3, in the valleys above the membrane. Potting of the upper tips prevents shunting of fluid directly from inlet 18 to outlet 20 without entering passages B. Support netting 34, a nonwoven polypropylene mesh (see the arrangement of its strands 35 in FIG. 4) sold under the Du Pont trademark Vexar, is also in the form of an accordion pleated sheet, and is positioned within membrane 30 on the membrane side adjacent casing 14 (FIG. 3). By this configuration, support netting 34 spaces apart the underside faces of adjacent membrane walls with two layers of the netting shown in FIG. 4, and provides parallel fluid flow passages underneath the membrane, indicated by D in FIG. 3. Netting 34 is not bonded to either casing, except at its longitudinal ends, as will be described hereinafter, and unlike membrane 30 does not fold over fins 16.

Both membrane 30 and netting 34 are pleated along generally parallel lines, and strands 35 run at 45° to those lines.

Casing 12 has a continuous peripheral ridge 50 that seats in continuous peripheral groove 52 of shelf portion 54, which surrounds casing 14. When casing 12 and casing 14 are so interfitted, the tips of fins 16 are vertically spaced from the adjacent inner surface of casing 12 and from ribs 36 running transversely on that surface, to avoid cutting of membrane 30 between the pointed fin tip and casing 12.

Figure 5:
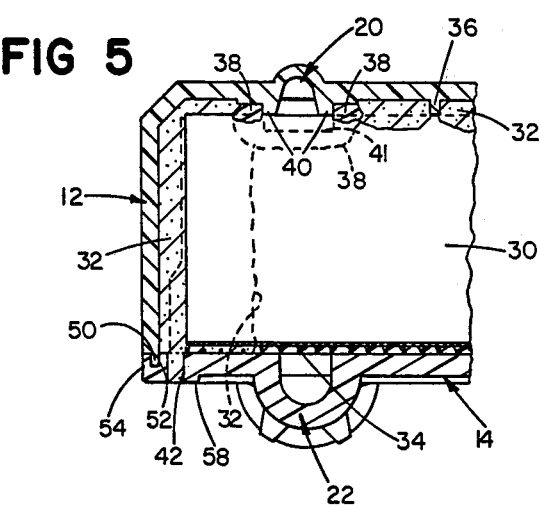
FIG. 5 is a sectional view along 5—5 of FIG. 1.

Longitudinal ends of membrane 30 and netting 34 are bonded to casings 12 and 14 by potting 32 (FIG. 5). Transverse ribs 36 (one shown in FIGS. 2 and 5) of casing 12 space the folded tips of membrane 30 from the casing ceiling to provide channels for flow of potting 32 during construction of dialyzer 10, described hereinafter. Ribs 36 have arcuate portions 56 which laterally space fins 16 from the angled and vertical sidewalls of casing 12 by tangential contact with fins 16 through membrane 30; portions 56 permit the flow channels to extend from the central fluid chamber between fins 16 to the side compartments between each fin and the corresponding sidewall of casing 12. A continuous ridge of General Electric RTV 108 thixotropic silicone rubber adhesive 38 adjacent casing ribs 40 surrounds the channel portion of outlet 20 (and in the same way inlet 18, though not shown) and bonds to the membrane tips, to act as a formed-in-place gasket in order to prevent flow of potting 32 into the channel area during construction. The adhesive needs to be thixotropic so that it will not itself wick across the membrane folds in the manifold area and thus block entrances to passages B. Inlet 18 and outlet 20 thus cooperate along their channel portions with membrane 30 to form inlet and outlet manifolds into and out of the fluid passages indicated at B in FIG. 3. Likewise inlet 22 and outlet 24 cooperate along their channel portions with membrane 30 on its underside to form inlet and outlet manifolds into and out of the fluid passages indicated at D in FIG. 3.

In constructing dialyzer 10, one pleats a sheet of membrane 30, pleats a sheet of netting 34, and combines the two by placing each fold of netting within a corresponding fold of membrane (FIG. 3). The resultant membrane-netting stack is squeezed together and placed in a casing 14 between fins 16, with each of the two outermost flaps of membrane 30 folded over its respective fin. Each outermost flap is then sealed to the outer face of the adjacent fin 16 with polyurethane potting 32. Casing 12 is then provided, and two ridges of silicone rubber adhesive 38, each having a weight of approximately one gram, are then applied around the outer edges of the channel portions of inlet 18 and outlet 20 of casing 12, adjacent ribs 40 and on end shoulders 41 (one shown in FIG. 5). Casing 14 is then interfitted with casing 12. Ridge 50 is wetted with solvent and then pressed into groove 52, to which it bonds on drying. A ramp portion 48 running along the base of each fin 16 serves to guide ridge 50 into groove 52. The interfitting is done while the silicone adhesive 38 is still wet so that it will seep a short way (about 1/16 to ⅛ inch) into the membrane folds to prevent wicking of polyurethane potting in the folds in the manifold area and consequent undesirable blockage of fluid flow into or out of the folds. The membrane and netting longitudinal ends are then potted in polyurethane 32, which is applied through holes 42 in casing 14 at each end thereof by a needle inserted through tapes (not shown) placed on raised portions 58 and covering the holes 42 (only one hole is shown in FIG. 5). Dialyzer 10 is held vertical during this process, with the end to be potted at the bottom. After curing of the potting at the end, the dialyzer is rotated 180°, with the other end at the bottom, ready to receive its potting. Potting seeps into the netting side of the membrane but not generally into the other side (FIG. 5). Holes 42 are sealed with the hardened potting, and the tapes are removed.

The potting of the membrane tips and flaps to casing 12 now takes place. Dialyzer 10 is positioned horizontally with the membrane tips to be potted below the membrane body and horizontally aligned, with casing 12 on the bottom (inverted from FIG. 2). Plugs (not shown) are placed in inlet 22 and outlet 24, and a needle is inserted through one of the plugs to apply 300 mmHg positive pressure from a pressure source through netting 34 against the face of membrane 30 adjacent casing 14. The pressure source is removed after pressurization is complete, and a pressure gauge is used to check for leaks. The plug maintains the pressure. Inlet 18 and outlet 20 are open to atmospheric pressure. Approximately 60 cc of polyurethane potting 32, which comprises an initially liquid mixture of Polyol 936 and Vorite 689, a urethane prepolymer, both manufactured by N. L. Industries, Bayonne, N.J., is then pumped into dialyzer 10 through hole 44 (FIG. 2) in one sidewall of casing 12. The potting flows into the side compartment formed between the sidewall of casing 12 and one fin 16 through channels between arcuate rib portions 56, down into the trough of casing 12, transversely through channels formed by 0.06 inch deep transverse ribs 36 (FIG. 5), and again through channels between arcuate portions 56 up into the other side compartment between the other sidewall of casing 12 and the other fin 16. Arcuate portions 56 prevent fins 16 from flaring outward to contact the sidewalls of casing 12 and thereby block potting flow into or out of the side compartments. A pair of pinholes (not shown) in casing 14, one adjacent inlet 22 and the other adjacent outlet 24, let air escape as the potting is pumped in. The potting settles uniformly on the inner surface of casing 12 and reaches the same level in each side compartment. Because of the positive pressure maintained on the opposite side of membrane 30, passages B are closed up, and the potting cannot wick or otherwise flow up between the folds. After a curing time of 60 minutes, one of the plugs is removed to permit a vacuum to be applied to the membrane side that initially received the higher pressure. Ten dialyzers 10 are connected in parallel to a vacuum pump through a 25 gauge one inch long needle acting as a pneumatic resistor, and the evacuation produces a negative pressure from 20 to 24 inches of mercury. The resistor chosen gives a desirable rate of evacuation. If evacuation is either too fast or too slow, unwanted bubbles will form in the polyurethane potting.

As a result of the evacuation, the folds of membrane 30 are drawn back from each other, enlarging the spaces between the folds, and are drawn tightly and even crushed against the folds of netting 34 (FIG. 6), which then support the membrane. The now more viscous potting can seep up into the spaces between the membrane folds to increase the bonding surface area provided by the membrane tips and thereby improve the casing-membrane bond effected by the potting. However, the potting is too viscous to seep undesirably far into those spaces so as to interfere with flow passages B. Curing time between the pressure and evacuation steps is important; if the time chosen for the particular potting compound is too short, the potting will not be viscous enough and will seep too far into the spaces between the membrane folds when the vacuum is applied, thus interfering with fluid flow passages B. If the time is too long, unwanted bubbles will form in the potting because of its increased viscosity.

After further curing, dialyzer 10 is ready for use.

Dimensions of dialyzer 10 are as follows. Its housing is approximately 12 inches by 3⅝ inches by 2 inches. Membrane 30 has a dry thickness of 13.5 microns and an actual surface area of approximately 1.54 m². Netting 34 has 16 strands per inch and a mean thickness of 0.022 inch. Both membrane and netting have 66 folds ("folds" meaning adjacent pairs of membrane or netting walls joined along a crease), which is equivalent to the number of upper tips of membrane 30 affixed to casing 12 (far fewer folds are shown in the somewhat diagrammatic view of FIG. 2). There are 65 fluid flow passages B along the folds. The channel portions of inlet 18 and outlet 20 are approximately 2¾ inches long, ⅜ inch wide and 5/32 inch deep adjacent the tubular portion of the inlet or outlet, which acts as a port, and ⅜ inch wide and 1/16 inch deep at the narrower channel tip. There are seventeen ribs 36, spaced about ½ inch apart, and seventeen corresponding pairs of arcuate portions 56. Additionally, there is a pair of arcuate portions 56 (not shown) between each longitudinal end of casing 12 and inlet 18 and outlet 20.

2. Operation

When used as a hemodialyzer, dialyzer 10 operates as follows. Blood tubing is connected to inlet 18 and outlet 20, and dialysate tubing is connected to inlet 22 and outlet 24. Dialyzer 10 is mounted vertically, with inlet 18 and outlet 24 on top. Blood is introduced into inlet 18, flows along its channel portion, and then, partly because of the potting 32, flows into the spaces B between the folds of membrane 30 and in the general direction indicated by arrows in FIG. 3, until it is collected in the channel portion of outlet 20 and then passes out of dialyzer 10. Dialyzing fluid or dialysate is introduced into inlet 22 and flows along its channel portion where it is distributed into all of the dialysate flow passages D (FIG. 3), and flows in the general direction indicated by arrows in FIG. 3, countercurrently with blood flow. It has been found that the membrane tips adjacent casing 14 do not need to be potted to it, when dialysate is introduced on this side. Dialysate is collected in the channel portion of outlet 24 and then passes out of dialyzer 10, from which it is collected for regeneration or disposal. Dialysis occurs across membrane 30. Blood is introduced into its inlet port with use of a pump while dialysate is introduced into its inlet port at a lower pressure. Thus in addition to removal of unwanted substances from the blood by dialysis, dialyzer 10 effects removal of water from the blood through membrane 30 because of the pressure difference across the membrane.

In normal operation dialysate flows upward because of the vertical positioning of dialyzer 10, and the dialysate flow paths D (FIG. 3) are constantly being degassed as dialysate flows in that direction. The blood flow paths B (FIG. 3) are degassed prior to dialysis by inverting dialyzer 10, introducing a saline priming solution, and having that solution flow upward for a predetermined time.

Figure 6:
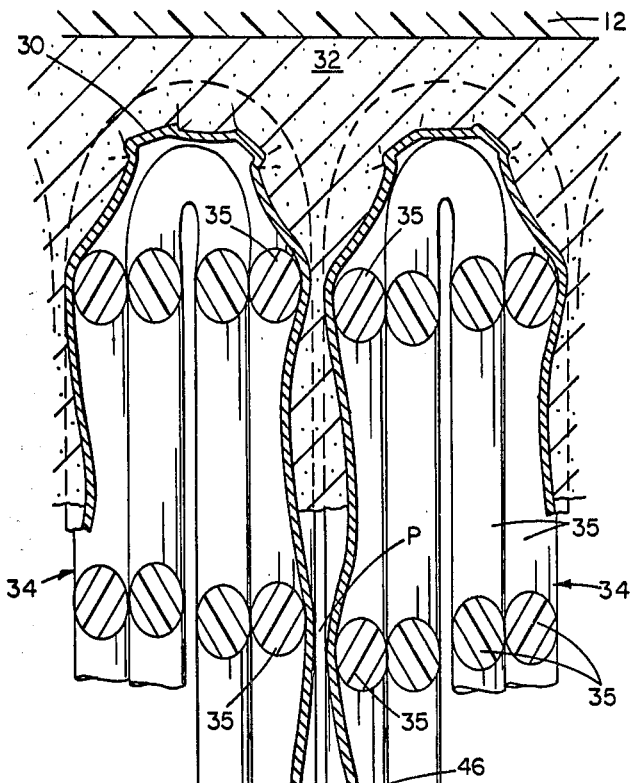
FIG. 6 is a greatly enlarged vertical sectional view like that of FIG. 2 of a portion of the membrane and support netting of the embodiment of FIG. 1.

An enlarged view of the arrangement of support netting 34 and membrane 30 is shown in FIG. 6. Potting 32 has seeped somewhat into the space between the folds shown, to increase the bonding area and hence improve the bond between membrane tips and the potting. The pleated sheet configuration of netting 34 provides a spacer between adjacent membrane folds that is two layers thick. The effect is to increase the dialysate flow passages and to lower the dialysate pressure drop through the dialyzer. The double layer of netting tends not to entrap air bubbles, which on accumulating would impede dialysate flow and increase the pressure drop. Instead the bubbles desirably wash on through. As to blood flow, strands 35 tend to pinch adjacent folds of membrane 30 at spaced points designated P in FIG. 6. Between points P portions of folds of membrane 30 sag into inter-strand spaces of netting 34 to create separate blood flow passages 46. Pressure from the blood helps keep the membranes apart for blood flow.

Dialyzer 10 provides the following specifications and results when used in hemodialysis:

| Pressure Drops | |
|---|---|
| Blood (at flow rate, $Q_B$, of 200 ml/min. and Transmembrane Pressure (TMP) of 100 mmHg) (Hematocrit = 30%) | 15 mmHg |
| Dialysate (at flow rate, $Q_D$, 500 ml/min. and TMP of 100 mmHg) | 2 mmHg |
| In Vitro Clearances* | |
| ($Q_B$ = 200 ml/min. $Q_D$ = 500 ml/min. | TMP = 100 mmHg) |
| Urea | 140 ml/min. |
| Creatinine | 120 ml/min. |
| B-12 | 31 ml/min. |
| Ultrafiltration Rate (in vitro)* | 3.6 ml/hr/mmHg TMP |
| Blood Volume | |
| 100 mmHg TMP | 85 ml |
| 200 mmHg TMP | 120 ml |
| Dialysate Volume | 730 ml |
| Maximum TMP | 500 mmHg |

*Performance subject to variations in Cuprophan membrane.

Variations and Modifications

The invention has other uses beside that in hemodialysis; for example, it can be used in laboratory dialysis.

Other embodiments of the invention will be obvious to those skilled in the art.

Other Inventions

The method of sealing off fluid inlets and outlets from seepage of potting thereinto was the joint invention of Dennis Hlavinka and Frank Corbin, and their U.S. patent application entitled "Forming Fluid Manifold" was filed on Apr. 4, 1977, as Ser. No. 784,363.

The fin-membrane sealing construction was the invention of Donn D. Lobdell, and his U.S. patent application entitled "Edge Sealed Pleated Membrane" was filed on May 15, 1978, Ser. No. 906,064, as a continuation of Ser. No. 784,362, which was filed on Apr. 4, 1977 and is now abandoned.

The pressure-evacuation two-step method for anchoring the membrane tips to the casing was the invention of Dennis J. Hlavinka, and his U.S. patent application entitled "Potting Pleated Membrane" was filed on June 29, 1977, as Ser. No. 810,956.

What is claimed is:

1. A method of bonding the tips of a pleated membrane to the interior of the housing of a fluid flow transfer apparatus comprising the steps of:
   providing a housing having a central chamber and manifold compartment means for communicating with said chamber,
   placing a pleated membrane within said central chamber,
   injecting liquid potting material into said manifold compartment means,
   positioning said housing, while said potting is still flowable, so that the membrane tips to be anchored to the housing are horizontally aligned at the bottom of the membrane body and the inner housing surface adjacent to those tips is horizontal,
   allowing said potting to flow from said manifold compartment means into said central chamber between said inner housing surface and said lower membrane tips, said potting being sufficiently flowable that it will settle uniformly therebetween, said manifold compartment means spreading out said potting for more uniform, distributed flow of said potting into said central chamber, and curing said potting material to anchor said tips to said housing.

2. The method of claim 1 wherein said housing provided in said providing step has an inlet and an outlet, a first rib in said central chamber adjacent to said inlet and a second rib in said central chamber adjacent to said outlet, each said rib being between said inlet and outlet, and a plurality of spaced apart ribs positioned between said first and second ribs and extending along the inner surface of said central chamber from said manifold compartment means, wherein said membrane is so placed within said housing that said tips to be anchored are adjacent said ribs, whereby said tips are spaced from said surface, and, together with said plurality of ribs and said surface, define a plurality of flow channels for flow of said potting injected into said manifold compartment means and flowing therefrom across said central chamber inner surface for bonding said tips to said surface.

3. The method of claim 2 wherein said housing provided in said providing step has a pair of side compartments, one on each side of said central chamber, separated from said chamber by fins, and at least one of said side compartments is said manifold compartment means, said ribs extend into said side compartments and space the tips of said fins from housing inner surfaces, whereby said flow channels extend from said central chamber into said side compartments, to permit flow, before curing, of potting into or out of said compartments.

4. The method of claim 2 wherein said plurality of ribs in said central chamber of said housing provided in said providing step extend other than parallel to the fold lines of said pleated membrane.

5. The method of claim 1 wherein said manifold compartment means is a reservoir means for receiving potting and said injecting step includes filling said reservoir means with potting above the height of said tips when said tips are horizontally aligned at the bottom of said membrane body whereby said reservoir means acts as a reservoir to distribute potting therefrom uniformly into said central chamber.

6. The method of claim 5 further including the step of venting gas from said housing displaced by said potting.

7. The method of claim 1 further including the step of venting gas from said housing displaced by said potting.

8. In a fluid flow transfer apparatus having a housing, wherein said housing has a central fluid chamber, and a compartment adjacent to said chamber, an inlet and an outlet, a first rib in said central chamber adjacent to said inlet and a second rib in said central chamber adjacent to said outlet, each said rib being between said inlet and outlet, and a pleated membrane positioned within said central chamber, the tips of which membrane on at least one side thereof are bonded to an inner surface in said central chamber of said housing, the improvement comprising:

a plurality of spaced apart ribs on said inner surface of said central chamber of said housing positioned between said first and second ribs and extending from said compartment across said central chamber, whereby said tips are spaced from said surface, and, together with said plurality of ribs and said surface, define a plurality of flow channels for flow of potting material placed in said compartment and flowing therefrom along said surface for bonding said tips to said surface.

9. The apparatus of claim 8, wherein said housing comprises two interfitting casings and there is a second compartment, both of said compartments being side compartments, one on each side of said chamber, said side compartments are each formed by a pair of sidewalls from each of said casings and separated from said central chamber by one of said sidewalls from each of said pairs, and said ribs have arcuate portions extending into said side compartments to space apart said side-compartment-defining sidewalls, thereby to extend said channels from said central fluid chamber into said side compartments.

10. The apparatus of claim 9 wherein said plurality of ribs extend transversely to the fold lines of said pleated membrane.

11. The apparatus of claim 8 wherein said plurality of ribs extend transversely to the fold lines of said pleated membrane.

12. The apparatus of claim 8 wherein said plurality of ribs extend other than parallel to the fold lines of said pleated membrane.

* * * * *